June 2, 1942. G. H. BURT 2,285,145
CONVEYER CHAIN AND METHOD OF LUBRICATING THE SAME
Filed Jan. 11, 1940
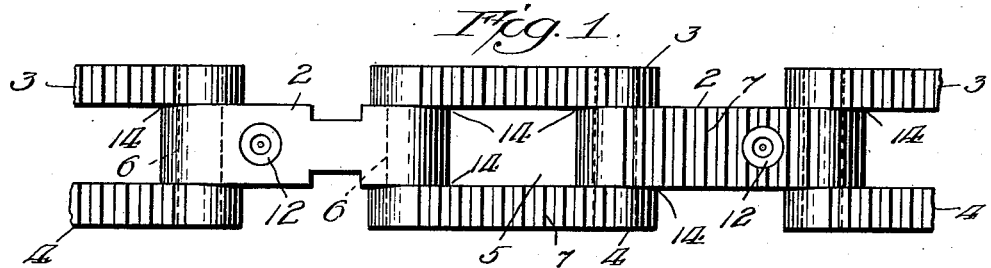
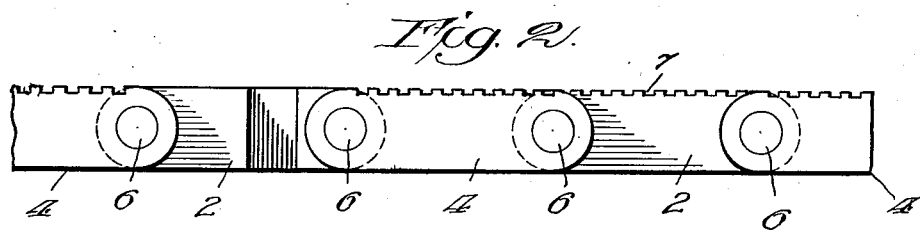
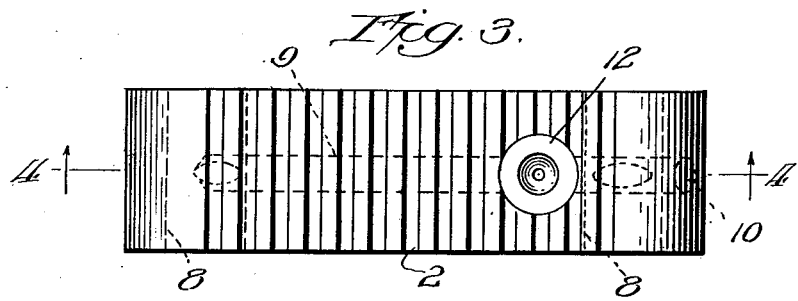
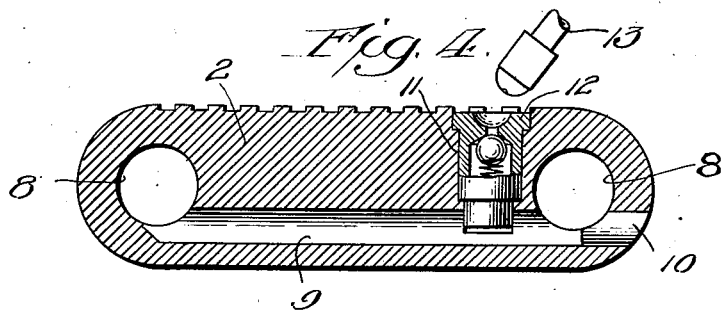
Inventor:
George H. Burt
by Edwd Hampson, Atty.

Patented June 2, 1942

2,285,145

UNITED STATES PATENT OFFICE 2,285,145

CONVEYER CHAIN AND METHOD OF LUBRICATING THE SAME

George H. Burt, Metairie, La., assignor to The Celotex Corporation, Chicago, Ill., a corporation of Delaware Application January 11, 1940, Serial No. 313,363

9 Claims. (Cl. 74—257)

This invention relates generally to a new and improved conveyer construction, and more specifically to a conveyer chain wherein the links thereof comprise new and novel features particularly with respect to the lubrication of such links, the invention having for its general objects to provide a link, as well as a method of lubricating the same, which are simple and more effective than those heretofore proposed.

In connection with a conveyer chain, a most important feature thereof relates to its lubrication. The ease of lubrication is important as well as is the time required for lubrication, and of course provision for thorough and lasting lubrication is essential.

Ease of lubrication is of great importance since the easier and the shorter the time required for lubrication the less the inoperative time out for lubrication.

The thoroughness of lubrication and the length of time for which a lubrication is effective is very important because the more thorough a lubrication, and the greater the length of time for which a lubrication serves, the less often is it necessary to lubricate. To improve the characteristics of a conveyer chain with respect to those features just above mentioned, it is particularly the object of this invention to provide a chain construction such that its lubrication requires the minimum of time, the lubrication is easily accomplished and is thorough, and a lubrication is effective for a relatively long period of time.

Other objects of this invention are the provision of a chain construction wherein wear and consequent lengthening is greatly reduced, the inoperative or idle period for lubrication is a minimum, and lubrication is required less often than with heretofore known constructions.

Still other and further objects of the invention hereof are, the provision of a conveyer chain generally superior to the conveyer chain heretofore commonly in use, one having greater life, as well as one requiring less upkeep and having other important advantages, all as will become apparent upon reading the following description.

With these and other objects in view the invention resides in the novel details of construction and combinations of parts constituting the apparatus, as well as in the novel steps and combinations of steps constituting the method of lubrication, all as will be disclosed in the following description and particularly covered by the claims.

Referring to the accompanying drawing forming a part of this specification and in which like numerals designate like parts in all the views, Fig. 1 is a top plan view of a section of block chain made in accordance with this invention;

Fig. 2 is a side elevation thereof;

Fig. 3 is a top plan view in enlarged detail of a block link; and

Fig. 4 is a vertical cross sectional view of a block link, said view taken as on the line 4—4 of Fig. 3 and looking in the direction of the arrows.

For a clear understanding of the inventions hereof it is to be understood that the drawing illustrates only a short section of a conveyer chain and the details of one of the block links therein and that, for use as a conveyer chain, a sufficient number of the various elements of the chain will be connected as particularly illustrated in Figures 1 and 2 to form a conveyer of such length as is desired.

For a particular use to which the conveyer chain comprising the invention hereof has been put, such as for conveying tile on a double end tennoner, the chains have been of the length of about 20 to 24 feet, two spaced chains being used so as to feed the tile properly through the machine.

In a machine as above mentioned the conveyer chains are of course mounted on suitable sprockets provided at each end of the machine, suitable means being provided for rotating a sprocket in order to drive the chains.

No attempt has been made in the drawing to illustrate in entirety a conveyer chain made up of the elements illustrated, nor the actual use of such a conveyer chain, since the chain and its use will be readily understood by anyone having any skill in the art involved, and such illustration would serve no useful purpose.

Referring to the drawing the numeral 2 designates a link of the chain adapted to receive the thrust of the tooth of a driving sprocket not shown, and 3 and 4 designate the side members associated with said link for keeping the tooth of the sprocket within the opening 5 of the chain, the side members being secured to the link 2 by a pintle such as 6 to have flexible rotational relation therewith, all in the usual manner, the serrations 7 shown being for the purpose of making better contact with the object being conveyed by the chain.

The link 2 is provided at each end thereof with a bore 8 extending transversely of the link for receiving therein the pintle 6, and a passage way 9 is preferably drilled through the body of the link to extend longitudinally thereof, or in the direction of the intended link travel, and to connect the interior surfaces of the bores 8, a suitable plug indicated at 10 being driven into the end of the passageway from the outer surface of the link to close said passageway at that end thereof. A duct 11 is drilled also through the body of the link from a relatively flat surface thereof to communicate with the passageway 9, and in said duct there is fitted a non-return valve of any suitable type indicated at 12, the valve illustrated in Fig. 4 comprising a member having an interior chamber in which is disposed a spring pressed ball to close the opening into said chamber after lubricant has been forced through such opening, such valve being well recognized in connection with lubrication and hence requiring no further detailed description. Obviously said valve could be disposed in any portion of the body of the link so long as it is in lubricant conducting relation with the passageway 9, though preferably it is disposed in the region of the body between the two pintle bores, and communicates with an outside surface of the link. 13 designates the end of any suitable nozzle adapted to cooperate and coact with said valve and by means of which the lubricant, preferably grease, may be forced through said valve and/or duct into the passageway 9 to reach the bores 8 constituting the bearings for the pintles.

Thus it will be understood from this construction that the grease or other lubricant is forced into and through the non-return valve 12 to enter the passageway 9 and, under the pressure of such lubricant force feed, will travel through said passageway to the bores 8 having the pintles 6 therein and lubricate such bores as bearings for the pintles, some of the grease extruding from the ends of such bores to lubricate the surfaces as at 14 between the sides of the link 2 and the inner side of the side members 3 and 4. Further, the passageway 9 is of sufficient size to serve as a reservoir for an adequate supply of lubricant to last for an appreciable extent of time whereby renewed lubrication of the links may be made at greater intervals of time than is the case in any conveyer chain now known. Lastly, the valve 12 may be disposed in any part of the body of the link found best suited in connection with the use of the conveyer chain and/or the construction of the machine of which the chain forms a part to render the lubrication of the chain more easy.

Comparing a conveyer chain incorporating the inventions hereof with a conventional block link conveyer chain, each of the same length (about 24 feet), and in use under and subject to like conditions, the following results have been noted. Whereas after 8 weeks' operation the improved chain showed a total increase in length not exceeding $\frac{1}{32}$ of an inch, the conventional chain increased in length from $\frac{1}{8}$ of an inch to $\frac{3}{16}$ of an inch per week, which would amount to a total of at least one inch for the eight weeks' period, or a minimum of 32 times the elongation of the improved chain. Further, with a conventional chain incorporating links having oil holes therein with screws engaging and closing said holes, it required about eight hours' time for two men to lubricate a pair of these chains, and then the oil would only last for approximately half a day. Other conventional chains were sought in an effort to reduce the time and cost of lubrication, and one was found wherein the oil holes were not threaded for screws but were fitted with spherical closures somewhat like BB shot which could be picked out and then replaced after lubrication, but even with this chain approximately six hours were required to lubricate the pair of chains and this method of oiling was such that the lubricant lasted only for several hours. The chain of this invention was then developed and has proved exceptionally efficient in that two men can clean the chains and lubricate the pair thereof within one hour and the lubricant will last for at least twenty-four hours of chain operation, whereby the chains can be cleaned and lubricated for example during the noon shutdown.

Thus it will be seen that by this invention there is provided a drive chain for a conveyer or the like comprising a plurality of links, each link having a bore adjacent one end of the link for receiving a pintle therein, there being provided a lubricant conveying passageway extending through the body portion of the link from an outer surface of the link to the surface of said bore, and a non-return valve in the passageway through which the lubricant may be forced under pressure to lubricate said pintle. More specifically the passageway is of such extent as to join the inner surfaces of the bores of the two pintle bearings in the link, and the valve may be disposed in a duct extending from said passageway to an outer surface of the link. Further the lubricant at all times is exterior with respect to the pintle as contradistinguished from any prior construction wherein the lubricant is forced through, and therefore is interiorly of, the body portion of the pintle.

In the lubrication of this improved chain there is utilized the method of lubrication wherein lubricant under pressure is forced through the body of the link past a non-return valve to flush and to lubricate the pintle and the bearing therefor in the link, the non-return valve preventing retrograde movement of the lubricant after the lubricant has engaged the pintle and bearing surfaces.

It is obvious that those skilled in the art may vary the details of construction and arrangements of parts constituting the apparatus, as well as vary the steps and combinations of steps constituting the method of lubrication, without departing from the spirit of this invention and therefore it is desired not to be limited to the exact foregoing disclosures except as may be required by the claims.

What is claimed is:

1. A conveyer type chain link adapted to be lubricated with a high pressure lubricator and comprising a body portion, a pintle-receiving bore adjacent each end of the link, a surface thereof adapted for conveying, a lubricant conveying passageway extending from the aforesaid surface of the link through said body portion into tangential communication with the inner surfaces of said bores, and a high pressure non-return valve in said passageway mounted substantially flush with the surface of the link adapted for conveying, whereby the link is adapted for high pressure lubrication and for conveying.

2. A drive chain link adapted to be lubricated with a high pressure lubricator and comprising a body portion, a pintle-receiving bore adjacent one end of the link for receiving a pintle therein, a lubricant conveying passageway disposed within said body portion and tangentially joining the inner surfaces of said bore, a duct extending from said passageway to an outer surface of said link, and a high pressure non-return lubricating valve in said duct, whereby the link is adapted for high pressure lubrication.

3. In a drive chain adapted to be lubricated with a high pressure lubricator and comprising a plurality of links in overlapping relation, contiguous links one thereof pivoted relative another and pivot pins connecting said links, a high pressure lubricating check valve in alternate links, and passages in such links extending from the outer surface thereof and from the check valve to the pivot pins and terminating generally tangentially with respect to said pins, whereby the links are adapted for high pressure lubrication.

4. A drive chain adapted to be lubricated with a high pressure lubricator and comprising a plurality of links, and pins connecting adjacent links, links thereof having lubricating passages therein extending from an exterior surface of a link to adjacent a pin, a passage substantially terminating in tangential relation with respect to a pin, and a high pressure non-return lubricating valve in the passageway adjacent such surface of the link, whereby the links are adapted for high pressure lubrication.

5. A drive chain link comprising a body portion, a bore in said body portion for receiving a pintle therein, and a lubricant conveying passageway within said body portion and whose end terminates substantially in tangential relation with respect to said bore.

6. A drive chain link comprising a body portion, a bore in said body portion for receiving a pintle therein, and a lubricant conveying passageway within said body portion, one end of said passageway terminating in an outer surface of the link, and the other end of said passageway terminating substantially in tangential relation with respect to said bore.

7. A drive chain link comprising a body portion, a bore in said body portion for receiving a pintle therein, and a lubricant conveying passageway extending from an outer surface of the link through said body portion to the surface of said bore, said passageway terminating adjacent said bore and having its axis substantially tangent to the surface of the bore whereby to provide an enlarged lubricant delivery area therebetween.

8. A drive chain link comprising a body portion, a pintle-receiving bore adjacent each end of the link, and a lubricant conveying passageway extending from an outer surface of the link to the surfaces of said bores, said passageway having a portion the axis of which is substantially tangent with respect to the surfaces of the bores.

9. A drive chain link comprising a body portion, a pintle-receiving bore adjacent each end of the link, a lubricant conveying passageway within said body portion and substantially tangent to the surfaces of said bores, and a duct extending from an outer surface of said link to said passageway for supplying lubricant to the latter.

GEORGE H. BURT.